July 9, 1957
C. F. BOESTER
2,798,228
WASTE DISPOSAL SYSTEM
Filed March 29, 1954
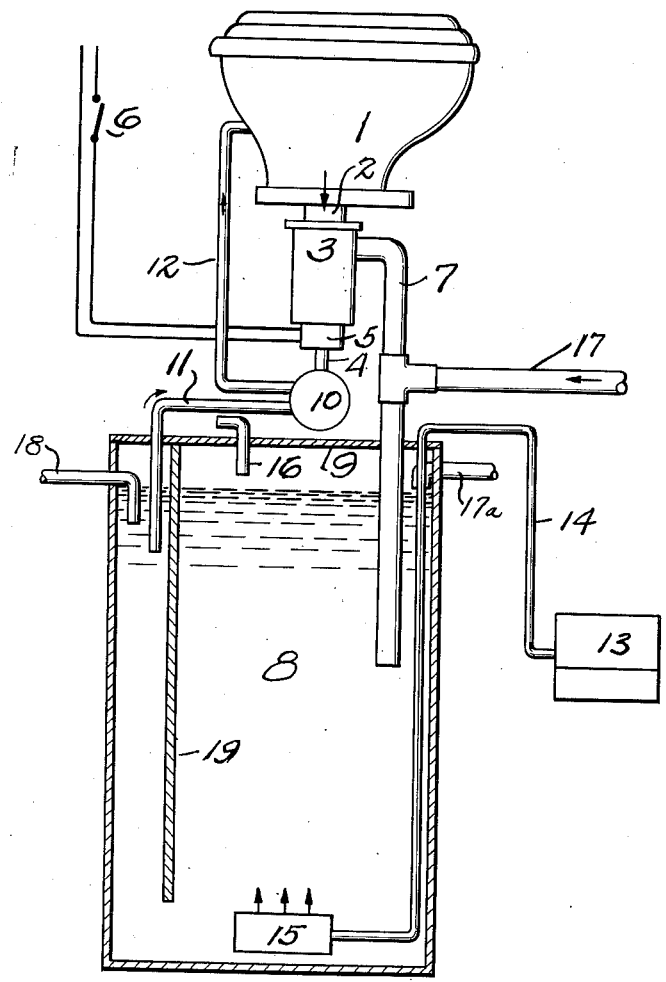
INVENTOR.
Carl F. Boester
BY
Rodney Bedell
atty

United States Patent Office 2,798,228
Patented July 9, 1957

2,798,228
WASTE DISPOSAL SYSTEM
Carl F. Boester, Arlington, Va.

Application March 29, 1954, Serial No. 419,416

6 Claims. (Cl. 4—10)

This invention relates in general to sewage disposal and, more particularly, to an independent waste disposal system for use with individual housing units.

One object of the invention is to provide a self-contained waste disposal system which permits maintenance of high sanitary standards while reducing water consumption and without requiring chemicals, the use of an anaerobic septic tank and disposal field, or connection to a community sewage system.

Another object is to provide an independent waste disposal system capable of reliable performance throughout substantially indefinite periods of time without maintenance or supervised operation and which is adapted for treatment of all household waste water.

Other objects of the invention are to effect simplicity of construction and economy in installation and operation.

These and other detailed objects will be apparent from the following description and accompanying drawing, which is a diagrammatic view in partial vertical section of a waste disposal system embodying the present invention.

The drawing illustrates a closed, self-contained, sanitary system for disposal of waste or sewage, such as human excreta, comprising a hopper-type toilet 1, not equipped with a water seal trap, for discharge downwardly at 2 to a comminuting or macerating unit 3 operated by the drive shaft 4 of a motor 5 controlled by a time switch 6. Comminuting unit 3 discharges to a sewage drain or waste pipe 7, the lower end of which terminates beneath the liquid level of a tank or reservoir 8, and preferably having a cover plate 9. The aqueous liquid in tank 8 may be untreated water.

Also, driven by motor shaft 4 is a pump 10, preferably of the self-priming type, such as a rotary pump, having its intake pipe 11 preferably at one side of tank 8. The pump outlet leads to toilet hopper 1 through pipe 12. Pump 10 supplies liquid from tank 8 to hopper 1 for flushing waste deposited therein and the flushing liquid and the waste carried thereby moves through comminuting unit 3 and thence to tank 8 through drain pipe 7.

Adjacent tank 8 is an air compressor 13 which is continuously driven by a small motor (not shown) and through tubing 14 and an air diffuser 15 near the bottom of tank 8 continuously discharges air into the lower portion of the body of liquid. Hence the tank liquid is constantly being aerated or, as is commonly known, aerobically processed, so that oxygen is steadily being supplied for effecting wet combustion of the organic, comminuted waste matter carried into tank 8 from unit 3. Since the waste matter is finely divided, maximum surface areas thereof are presented to facilitate the oxidation process. Air for treatment of the tank liquid is also provided by entrainment as the liquid flushes the toilet.

The carbonaceous matter is quickly oxidized in a matter of minutes to produce mainly carbon dioxide which escapes from the liquid in gas form and through a relief pipe 16. By this prompt oxidation process, liquid pumped from tank 8 to toilet 1 for ultimate return is odor free and non-toxic, the system being thereby rendered sanitary. Residual particles resulting from this oxidation will be harmless and inert, being comparable in chemical character to ash remnants from fuel combustion, and will gradually accumulate on the bottom of tank 8 and may be withdrawn at exceedingly long intervals, as every three or four years.

An individual using toilet 1 will trip time switch 6 to effect operation of comminuting unit 3 and pump 10, whereby waste will be flushed and ground. Time switch 6 will remain closed for a predetermined interval, such as thirty seconds, at the termination of which the flushing and comminuting action ceases. Any toilet paper will be substantially reduced to fibrous particles by comminuting unit 3 and will further disintegrate through soaking in the tank liquid.

The system of this invention operates with a fixed quantity of liquid which is recirculated, resulting in a marked conservation of water. It has been found that a three-hundred gallon tank is adequate for family usage for an indefinite period of time. The extent of the water reduction made possible by this invention becomes all the more apparent when it is recognized that the conventional type toilet uses from five to seven gallons at each flushing.

The waste disposal system is completely self-contained and operates with a predetermined, recirculated, aerobically processed liquid. By the comminution of the waste matter and the constant aeration of the waste within the body of the tank liquid, the system is maintained in a sanitary condition without the utilization of extraneous processes, such as additional and frequent chemical treatment of the liquid, filtration, sedimentation, change or replacement of liquid, anaerobic processing, or the like. By the simplicity of construction of the system, there is no necessity for continuous maintenance and supervised operation.

The system may also be adapted for accommodating all household waste water as well as toilet waste. To adapt the system for this purpose, a second sewage drain conduit 17 for other household waste water, such as from sinks, bathtubs and laundry, may communicate with drain pipe 7 below comminuting unit 3 for discharge into tank 8. The waste water drain, or additional drains, may connect to tank 8 independently of drain pipe 7, as indicated at 17a. An overflow pipe 18 is provided for maintaining a normal liquid level in tank 8 if a waste water drain is used.

To insure no inadvertent direct flow from drain pipe 7 or conduits 17, 17a to overflow pipe 18 or pump intake pipe 11, there is a baffle 19, the upper end of which is above the normal liquid level in tank 8 and the lower end of which is a short distance from the bottom wall of said tank. This forms a settling compartment for clarification of liquid.

The details of construction may be varied without departing from the spirit of the invention and the exclusive use of those modifications coming within the scope of the claims is contemplated.

What is claimed is:

1. A toilet and sewage treatment structure comprising a toilet bowl, an individual macerator associated with said bowl and adapted to directly receive and to comminute waste deposited in and discharged from said bowl and to thoroughly intermix comminuted waste with aqueous liquid received in and discharged from the bowl, a tank containing an aqueous liquid, a conduit from said macerator to said tank and adapted to discharge all of said comminuted waste and liquid mixture directly into said tank without separation thereof, means for continuously supplying a stream of air into said tank below the level of liquid therein, whereby the waste in said tank is continuously aerobically decomposed to render the aqueous liquid in said tank inoffensive, a pipe line having an inlet above the bottom of said tank and below the surface of the liquid therein and spaced substantially from the discharge end of said conduit, said pipe line having an outlet to the interior of the toilet bowl, a pump in said pipe line adapted to withdraw liquid from said tank and discharge it into said toilet bowl, and means adapted to simultaneously energize said macerator and pump at intervals, said structure forming a self-contained, sewage-disposal system.

2. A toilet and sewage treatment structure according to claim 1 which includes a second conduit adapted to discharge water and waste from a source other than said bowl into said tank, and a drain from the uppermost portion of the tank and spaced substantially from the discharge outlets of both said conduits and adapted to carry off inoffensive aqueous liquid from the tank when the liquid level in the tank exceeds a predetermined height.

3. A toilet and sewage treatment structure according to claim 1 in which the tank includes two compartments open to each other at their lower portions only, the conduit from the macerator and the air stream supply means discharging into one of said compartments, and the inlet to the pipe line to the bowl being in the upper part of the other one of said compartments.

4. A toilet and sewage treatment structure according to claim 3 which includes a second conduit adapted to discharge water from a source other than said bowl into said tank, and a drain from the uppermost portion of the tank and spaced from the discharge outlets of both said conduits and adapted to carry off inoffensive aqueous liquid from the tank when the liquid level in the tank exceeds a predetermined height.

5. A toilet and sewage treatment structure according to claim 3 which includes a second conduit adapted to discharge waste from a source other than said bowl into the compartment receiving the discharge from the macerator and the air supply means, and a drain from the upper part of the other compartment for carrying off liquid therefrom whenever the liquid level therein reaches a predetermined height.

6. A toilet and sewage treatment structure according to claim 1 wherein the means for energizing the macerator and pump does so for a predetermined period of time and is manually controlled.

References Cited in the file of this patent

UNITED STATES PATENTS

| | | |
|---|---|---|
| 327,269 | Hegeman | Apr. 29, 1885 |
| 691,365 | Dittler | Jan. 21, 1902 |
| 1,139,024 | Frank | May 11, 1915 |
| 1,303,358 | Montgomery | May 13, 1919 |
| 1,963,354 | Currie | June 19, 1934 |
| 1,996,325 | Cox | Apr. 2, 1935 |
| 2,249,739 | Brownell et al. | July 22, 1941 |
| 2,414,964 | McPherson | Jan. 28, 1947 |
| 2,604,633 | McPherson | July 29, 1952 |
| 2,622,858 | Hughes | Dec. 23, 1952 |
| 2,724,837 | McPherson | Nov. 29, 1955 |

OTHER REFERENCES

Sewerage and Sewage Treatment, Babbitt, 6th ed. (1947), pp. 454–464.